(12) United States Patent
Dhanoa et al.

(10) Patent No.: US 7,983,350 B1
(45) Date of Patent: Jul. 19, 2011

(54) DOWNLINK SUBCHANNELIZATION MODULE

(75) Inventors: Kulwinder Dhanoa, Windsor (GB); Mehul Mehta, Reading (GB)

(73) Assignee: Altera Corporation, San Jose, CA (US)

( * ) Notice: Subject to any disclaimer, the term of this patent is extended or adjusted under 35 U.S.C. 154(b) by 994 days.

(21) Appl. No.: 11/472,135

(22) Filed: Jun. 20, 2006

Related U.S. Application Data

(60) Provisional application No. 60/730,628, filed on Oct. 25, 2005.

(51) Int. Cl.
*H04K 1/10* (2006.01)
(52) U.S. Cl. ........ 375/260; 375/359; 370/344; 370/343; 455/59
(58) Field of Classification Search .................. 375/260
See application file for complete search history.

(56) References Cited

U.S. PATENT DOCUMENTS

| | | | |
|---|---|---|---|
| 7,398,453 B2* | 7/2008 | Yu ................. | 714/778 |
| 2003/0169824 A1* | 9/2003 | Chayat ........... | 375/260 |
| 2003/0174643 A1* | 9/2003 | Ro et al. ........ | 370/210 |
| 2004/0264507 A1* | 12/2004 | Cho et al. ...... | 370/480 |
| 2005/0002323 A1* | 1/2005 | Hadad ............ | 370/203 |
| 2005/0013279 A1* | 1/2005 | Hwang et al. .. | 370/343 |
| 2005/0025039 A1* | 2/2005 | Hwang et al. .. | 370/206 |
| 2005/0058193 A1* | 3/2005 | Saed .............. | 375/232 |
| 2005/0068931 A1* | 3/2005 | Cho et al. ...... | 370/345 |
| 2005/0094597 A1* | 5/2005 | Hwang et al. .. | 370/329 |
| 2005/0105589 A1* | 5/2005 | Sung et al. ..... | 375/130 |
| 2005/0135314 A1* | 6/2005 | Giannakis et al. | 370/335 |
| 2005/0157803 A1* | 7/2005 | Kim et al. ...... | 375/260 |
| 2005/0195910 A1* | 9/2005 | Kim et al. ...... | 375/260 |
| 2005/0201295 A1* | 9/2005 | Kim et al. ...... | 370/241 |
| 2005/0201476 A1* | 9/2005 | Kim et al. ...... | 375/260 |
| 2005/0201477 A1* | 9/2005 | Cho et al. ...... | 375/260 |
| 2006/0045192 A1* | 3/2006 | Hayashi ......... | 375/260 |
| 2006/0285484 A1* | 12/2006 | Papasakellariou et al. ... | 370/208 |
| 2007/0086534 A1* | 4/2007 | Subramanyam et al. ...... | 375/260 |
| 2007/0097915 A1* | 5/2007 | Papasakellariou ............ | 370/329 |
| 2009/0080544 A1* | 3/2009 | Yin ................ | 375/260 |

OTHER PUBLICATIONS

Hazen, Mark E.; "OFDM or OFDMA?"; http://rfdesign.com/ar/ofdm-or-ofdma/, 2 pages.

Yaghoobi, Hassan; "ScalableOFDMA Physical Layer in IEEE 802.16 WirelessMAN", 2004, *Intel Technology Journal*, vol. 8, No. 3, pp. 201-212.

"Air Interface for Fixed Broadband Wireless Access Systems"; 2004, *IEEE Std 802.16*, pp. 427-568.

\* cited by examiner

*Primary Examiner* — Chieh M Fan
*Assistant Examiner* — Santiago Garcia
(74) *Attorney, Agent, or Firm* — Ropes & Gray LLP

(57) ABSTRACT

In a transmitter of an orthogonal frequency division multiple access (OFDMA) system, a subchannelization module generates an OFDMA symbol with data on multiple subcarriers, from received incoming data packets. An input controller applies a first formula to determine a first index of each received data packet, and stores each received data packet at an address in memory according to its first index. An output controller applies a second formula to determine the nature of the data to be carried by each subcarrier in the OFDMA symbol and, if said second formula indicates that a data subcarrier should be output, reads the data from said memory, wherein said data packets are stored in said memory at addresses such that the data can be read out at least piecewise sequentially when generating the OFDMA symbol.

20 Claims, 5 Drawing Sheets

DOWNLINK SUBCHANNELIZATION MODULE

This invention relates to a downlink subchannelization module, in particular for use in a base station in a broadband wireless access system.

BACKGROUND

Products that allows users to transmit and receive data wirelessly at relatively high data rates are becoming common. One group of such products is known by the name WiMAX (Worldwide Interoperability for Microwave Access). Products that pass the conformity tests for WiMAX are capable of forming wireless connections between them to permit the carrying of internet packet data over relatively long distances.

IEEE802.16e is a standard under development that covers WiMAX broadband wireless access for fixed and mobile users. It is envisaged that a base station should be provided, having a fixed connection to a computer network such as the internet. System subscribers can then gain access to the computer network through the base station. Each base station must be able to provide service to multiple subscribers.

IEEE802.16e uses orthogonal frequency division multiplexing (OFDM) as the modulation technology. Symbols are created, each containing a number, N, of orthogonal carrier frequencies (referred to as subcarriers). Within a symbol, the different subcarriers carry nulls (to simplify filtering), pilot information (for channel estimation) or user data.

Orthogonal frequency division multiple access (OFDMA) is also used, allowing each symbol in the downlink (that is, the connection from the base station to user) to contain data for multiple users, i.e. the N subcarriers can be allocated to different users. To help achieve this, the subcarriers are grouped into subchannels, and one or more subchannels are allocated to each user.

However, the allocation of subcarriers to subchannels is not trivial. To help mitigate channel effects, the subcarriers allocated to a particular subchannel are spread throughout the symbol. To complicate things further, the allocation changes on alternate symbols as the subcarriers allocated to pilot information change. The IEEE802.16e specification details the permutation sequences, equations and look-up tables necessary to implement this mapping, but it provides no indication as to how to design the hardware implementation of such a system.

Therefore, broadband wireless base stations compliant with IEEE802.16e require a block to map data to be transmitted to different users into different subcarriers in the symbol to be transmitted. This block is referred to herein as a subchannelization module.

SUMMARY OF INVENTION

It is an object of the present invention to provide a subchannelization module for use in a broadband wireless access system.

According to a first aspect of the present invention, there is provided, in a transmitter of an orthogonal frequency division multiple access (OFDMA) system, a method of generating an OFDMA symbol with data on multiple subcarriers, from received incoming data packets. An input controller applies a first formula to determine a first index of each received data packet, and stores each received data packet at an address in memory according to its first index. An output controller applies a second formula to determine the nature of the data to be carried by each subcarrier in the OFDMA symbol and, if said second formula indicates that a data subcarrier should be output, reads the data from said memory, wherein said data packets are stored in said memory at addresses such that the data can be read out at least piecewise sequentially when generating the OFDMA symbol.

According to a second aspect of the present invention, there is provided a subchannelization module for use in a transmitter of an orthogonal frequency division multiple access (OFDMA) system.

This has the advantage that, in preferred embodiments, the module has low latency, low memory requirements, and yet is relatively simple, such that verification of its correct operation is a straightforward task.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION OF PREFERRED EMBODIMENTS

Figure 1:
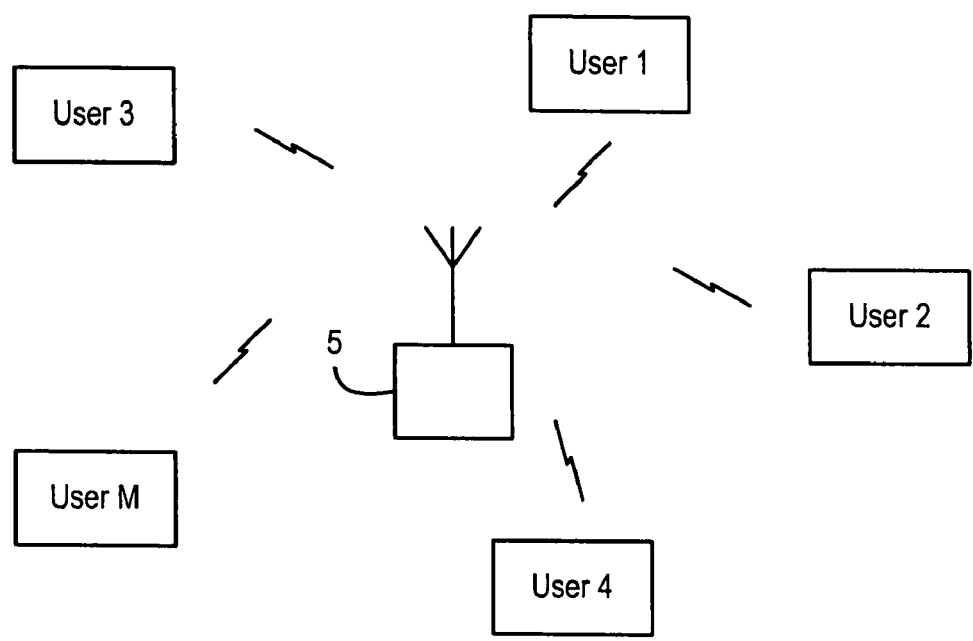
FIG. 1 is a schematic illustration of a wireless multiple-access system.

FIG. 1 is a schematic illustration of a wireless multiple-access system. A base station 5, having an antenna, transmits data for different users, User 1, User 2, . . . , User M, within the coverage area of the base station. Any number of users may be located within the coverage area, but there will be a practical limit, in this case M, on the number of users to whom simultaneous service can be provided. It will be appreciated that the active users are also able to transmit data to the base station, but the present invention is concerned only with the way in which the base station handles the data to be transmitted to the users, and only this aspect will be described further.

In the preferred embodiment, the system is in accordance with the IEEE802.16e standard, which uses orthogonal frequency division multiplexing (OFDM) as the modulation technology. Symbols are created, each containing a number, N, of orthogonal carrier frequencies (referred to as subcarriers). Within a symbol, the different subcarriers carry nulls (to simplify filtering), pilot information (for channel estimation) or user data. Each symbol transmitted from the base station can contain data for multiple users, i.e. the N subcarriers can be allocated to different users. To help achieve this, the subcarriers are grouped into subchannels, and one or more subchannels are allocated to each user.

Figure 2:
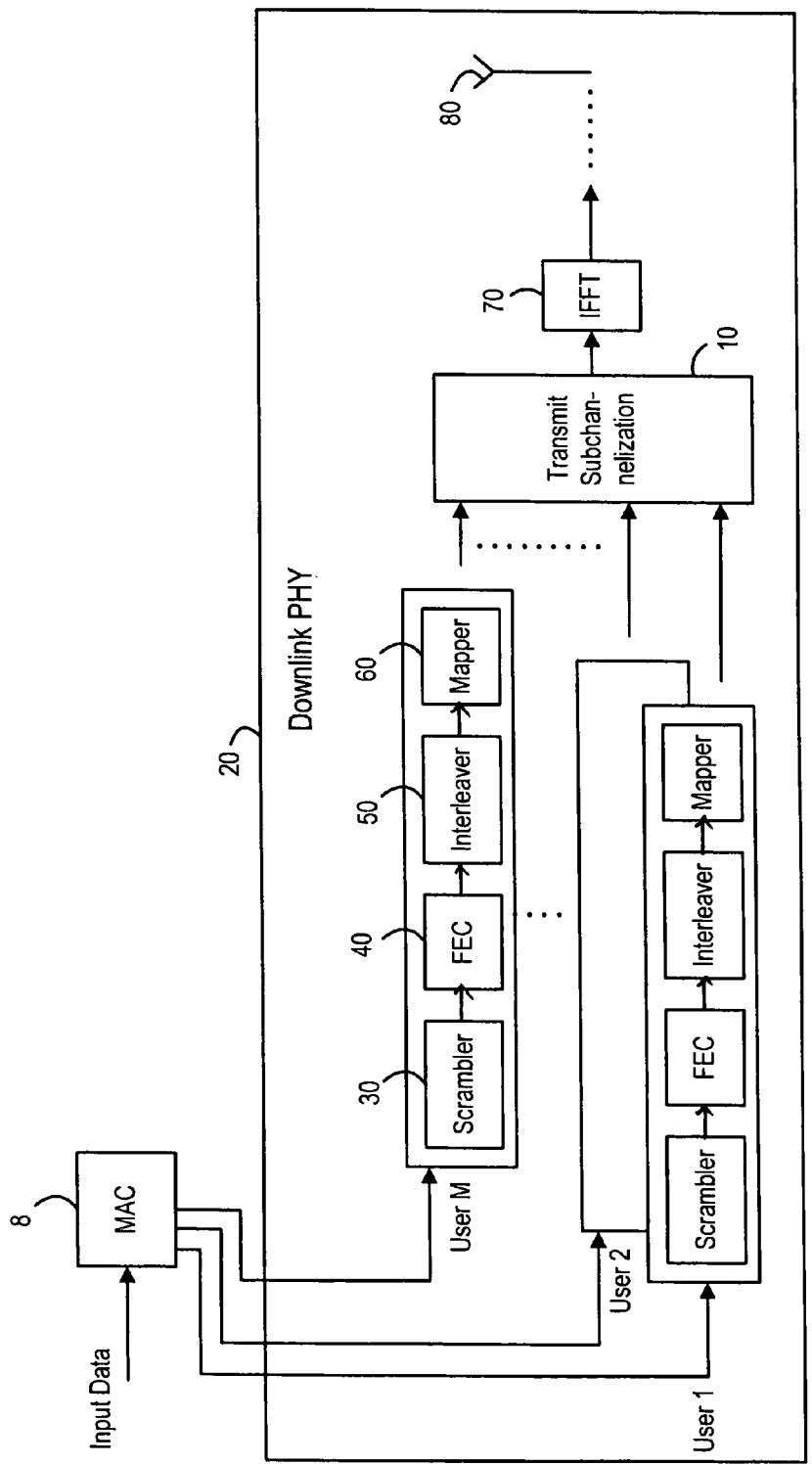
FIG. 2 is a block schematic diagram illustrating a part of a base station in the system of FIG. 1.

FIG. 2 is a block schematic diagram illustrating parts of the base station 5 used in transmitting data to individual users. It will be appreciated that the base station 5 includes many other components and features, which are not relevant to an understanding of the present invention, and will not be described further. Input data to be transmitted is first allocated to a particular subchannel in the symbol by a media access control layer (MAC) 8. Each data packet is flagged according to which subchannel it has been allocated. The data is then passed to the downlink physical layer (PHY) 20 for transmission.

A subchannelization module 10 may fit into a downlink OFDMA PHY 20, in accordance with the IEEE802.16e specification.

Thus, the data is divided into respective streams, intended for the users User 1, User 2, ..., User M. As illustrated here, each of the users has been allocated a respective one of the subchannels, and so each of these data streams contains the data for a respective subchannel. Where one or more of the users has been allocated more than one of the subchannels, then the respective data stream or data streams contains data for more than one of the subchannels.

Each of the data streams is passed to a respective data handling block, containing a scrambler 30. The output from each scrambler 30 is then passed to a forward error correction (FEC) block 40. The output from each FEC block 40 is passed to an interleaver block 50. The output from each interleaver block 50 is passed to a mapper block 60. The output from each mapper 60 is then passed to the subchannelization module 10.

The subchannelization module 10 maps the user data, already allocated to one or more subchannels by the MAC, to subcarriers in the symbol. In addition, it constructs OFDMA symbols in the frequency domain by adding null or pilot information to appropriate subcarriers. The generated OFDMA symbols are output to an inverse fast Fourier transform (IFFT) module 70, which converts them into symbols in the time domain. These symbols then undergo some further processing, such as addition of a cyclic prefix, and RF card processing (not shown), before being passed to the antenna 80, for transmission to the users.

It will be appreciated that, although FIG. 2 shows separate scrambler 30, FEC 40, interleaver 50 and mapper 60 blocks for each stream of user data, any arrangement of blocks having the same, or similar function may be used without affecting the invention. For example, single scrambler, FEC, interleaver and mapper blocks may be used for all user data, or one or more of those blocks may not be required in future implementations.

Moreover, the PHY described in FIG. 2 is merely an example, and as such the blocks therein are not discussed in detail hereinafter. The person skilled in the art may think of many different system implementations, all of which fall within the scope of the invention.

There are two main policies of subcarrier allocation detailed by the IEEE specification: namely fully used subchannelization (FUSC) and partially used subchannelization (PUSC). In FUSC mode, subchannels are contained within one symbol, while in PUSC mode, subchannels span over two consecutive symbols. In addition, in FUSC mode, data is allocated to subcarriers on a subcarrier-by-subcarrier basis; in PUSC mode, however, subcarriers are grouped into clusters of 12 data subcarriers and 2 pilot subcarriers.

As mentioned above, the mapping changes between odd and even symbols as pilot subcarrier positions change. Thus, a subcarrier that carried data in one symbol may carry pilot information in the next symbol. However, for each mode of operation (FUSC or PUSC) the order of data within the symbol remains the same for odd and even symbols. The IEEE specification gives a permutation formula for calculating a physical data subcarrier index for each packet of data to be written to a particular subcarrier, which stays the same from symbol to symbol, but refers to different subcarriers as pilot subcarrier positions change.

Figure 3:
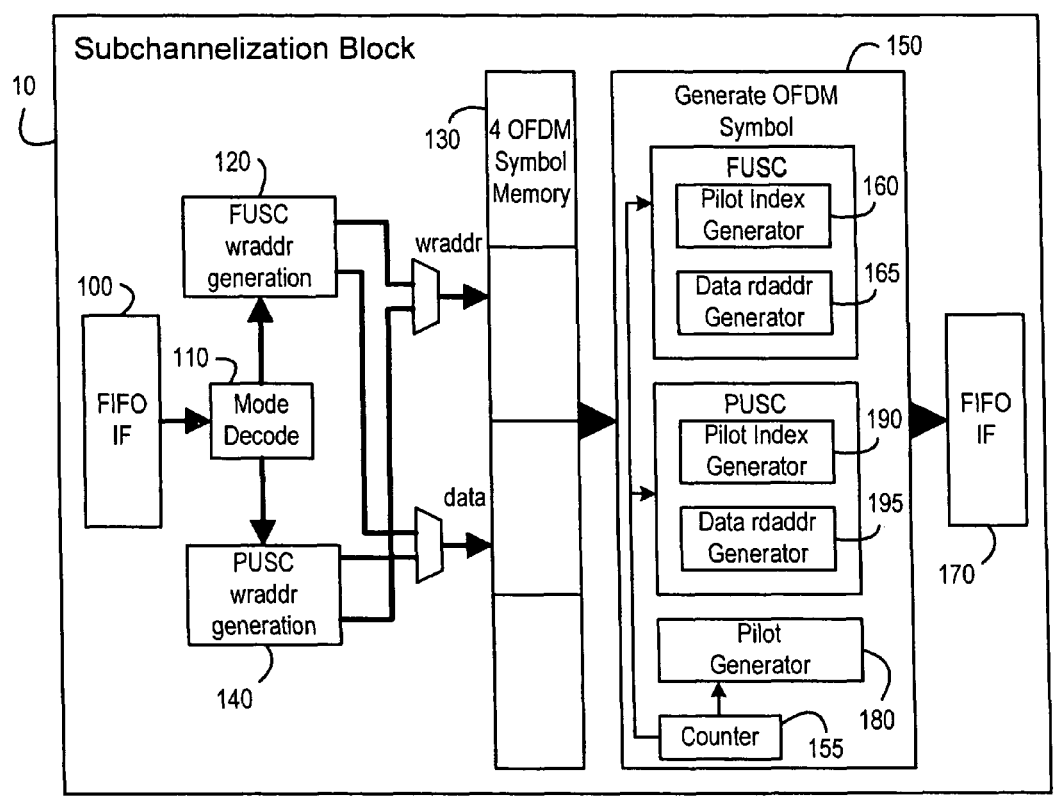
FIG. 3 is a block schematic diagram of a subchannelization module in the base station of FIG. 2, in accordance with one aspect of the present invention.

FIG. 3 is a schematic block diagram of the subchannelization module 10 according to an aspect of the present invention.

In the preferred embodiment, the subchannelization module 10 is implemented on a Filed Programmable Gate Array (FPGA) device, although it could equally well be implemented in a programmable logic device, or in an Application Specific Integrated Circuit (ASIC), or the various functions of the device described below could be performed in a suitably programmed processor.

A FIFO interface 100 accepts data and passes it to a mode decode block 110. Note that, in the illustrated embodiment, the FIFO interface 100 contains only a very small amount of memory, compared with the quantities of data passing therethrough, in order to provide a degree of pipelining. The mode decode block 110 determines on the basis of a separate control signal whether the subchannelization block 10 is to work in the FUSC mode or the PUSC mode, and outputs the data as appropriate.

That is, if the mode decode block determines that the subchannelization block 10 is to work in the FUSC mode, the input data is passed to a FUSC write address generation block 120. The write address generation block 120 determines to which subchannel the data packet has been allocated by the MAC, and uses this in conjunction with the permutation formula given in the IEEE specification to determine the logical data subcarrier index of the data packet. The logical data subcarrier index is then used to determine the address in memory 130 to which the data packet is written. The data packets are written to memory 130 in order of lowest numbered logical data subcarrier to highest numbered logical data subcarrier.

If the mode decode block determines that the subchannelization block 10 is to work in the PUSC mode, the input data is passed to a PUSC write address generation block 140, which performs a similar operation. However, as mentioned above, this mode is complicated by the fact that subcarriers are grouped into clusters. The IEEE specification gives another formula to determine how the subchannels are divided into subcarriers and clusters in PUSC mode. Thus, the PUSC write address generation block 140 determines to which subchannel the data packet has been allocated by the MAC, and uses this in conjunction with the formula given in the IEEE specification to determine the cluster number. Therefore, data is written to memory 130 such that data packets are grouped together in their appropriate clusters, and in order of lowest numbered logical cluster to highest numbered logical cluster.

The memory 130 is dual port RAM, and in a preferred embodiment is sufficient to hold user data for four complete OFDMA symbols. Data must be output from the subchannelization module 10 to the antenna 80 at a constant rate, and therefore there must always be at least one complete symbol, or two complete symbols when operating in PUSC mode, available to be read from the memory 130.

Thus, to operate in PUSC mode, the memory must be able to hold user data for up to four OFDMA symbols such that, as two symbols are being written to one half of the memory 130, the OFDMA symbol generator 150 can read completed user data from the other half of the memory 130. In FUSC mode, it is only necessary for memory 130 to be able to hold data for two OFDMA symbols, as only one symbol is constructed at any time.

The data is read out of the memory 130 by an OFDMA symbol generator 150, which contains a counter 155 which runs from 0 to N−1, where N is the number of subcarriers in the symbol.

In FUSC mode, a pilot index generator 160 uses this counter value with a formula from the IEEE specification to determine whether a null, a pilot value, or a user data subcarrier should be output to FIFO interface 170. If it is determined that a user data subcarrier should be output, a data read address generator 165 generates the address of the first data packet. Thereafter, data is read sequentially through memory 130. If it is determined that a pilot subcarrier should be output, pilot generator 180 outputs a pilot subcarrier. The operation of pilot generator 180 will be described in more detail below.

The operation of the OFDM symbol generator in FUSC mode will be described in more detail below.

In PUSC mode, pilot index generator 190 uses the counter value with another formula from the IEEE specification to determine whether a null subcarrier, or a non-null subcarrier should be output to FIFO interface 170. If it is determined that a non-null subcarrier should be output, then a physical cluster must be output, consisting of 12 data subcarriers and 2 pilot subcarriers. A data read address generator 195 contains a look-up table that indicates which logical cluster in memory corresponds to the required physical cluster, and the address for the start of the logical cluster is generated. Thereafter, all data for that cluster is read sequentially.

Thus, the organization of data in the memory 130 is a factor in ensuring low latency in operation of the design. The fact that the data are already at least somewhat organized into the order in which they will be output into the symbol means that the OFDMA symbol generator 150 can read one sample of data per clock cycle. No latency is added to the system by searching for the correct data to output, as the data for the whole symbol is read sequentially in FUSC mode, or piecewise sequentially for PUSC mode (i.e. each cluster is read sequentially).

It should be noted that, in PUSC mode, as the data is stored in the memory 130 in order of the logical cluster, the next physical cluster required to complete the symbol may not correspond to the next logical cluster in memory 130. Thus, data is read only piecewise sequentially in PUSC mode. However, this does not add latency to the system as each cluster is output over the course of 14 clock cycles. Therefore, the data read address generator 195 has 14 clock cycles to generate the address of the next physical cluster, which is ample.

The pilot generator 180 generates a pilot value for every subcarrier in the range 0 to N−1, but this value is only output into the symbol if the operative pilot index generator 160, 190 indicates that the current subcarrier is a pilot subcarrier. The form of the required pilot generator 180 itself is familiar to one skilled in the art. However, in this case, pilot values are generated for every subcarrier 'on the fly', thereby reducing memory requirements without introducing latency into the system.

Figure 4:
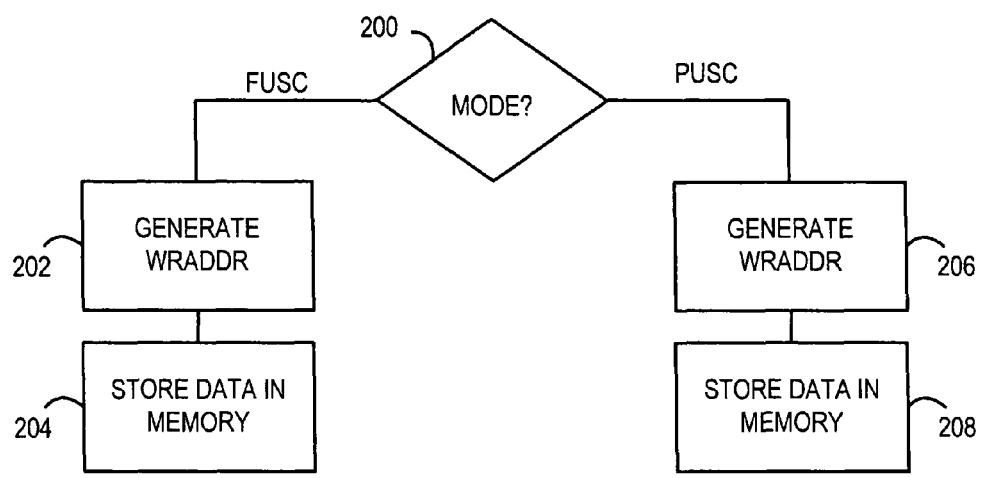
FIG. 4 is a flow diagram of the method of storing data in memory in accordance with an aspect of the present invention.

FIG. 4 is a flow diagram of the method of storing data in memory according to one aspect of the present invention.

First, the mode of operation of the subchannelization module, FUSC or PUSC, is determined in step 200. If the subchannelization module is operating in FUSC mode, the write address is generated in step 202. Step 202 involves determining the subchannel to which the data has been allocated, and applying the permutation formula for FUSC mode, given in the IEEE specification, to determine the logical data subcarrier index. A write address is then generated in accordance with the logical data subcarrier index, such that all data is written into memory 130 in order of lowest logical data subcarrier index to highest logical data subcarrier index. In step 204, the data is then written to the memory address generated in step 202.

If the subchannelization module is operating in PUSC mode, the write address is generated in step 206. Step 206 involves determining the subchannel to which the data has been allocated, and applying the permutation formula for PUSC mode, given in the IEEE specification. The permutation formula for PUSC mode groups all the subcarriers into clusters, and the write address is generated in accordance with the cluster number and the physical data subcarrier index, such that all data is written into memory 130 in order of lowest physical cluster to highest physical cluster, and lowest physical data subcarrier index to highest physical data subcarrier index within each physical cluster. In step 208, the data is then written to the memory address generated in step 206.

Figure 5:
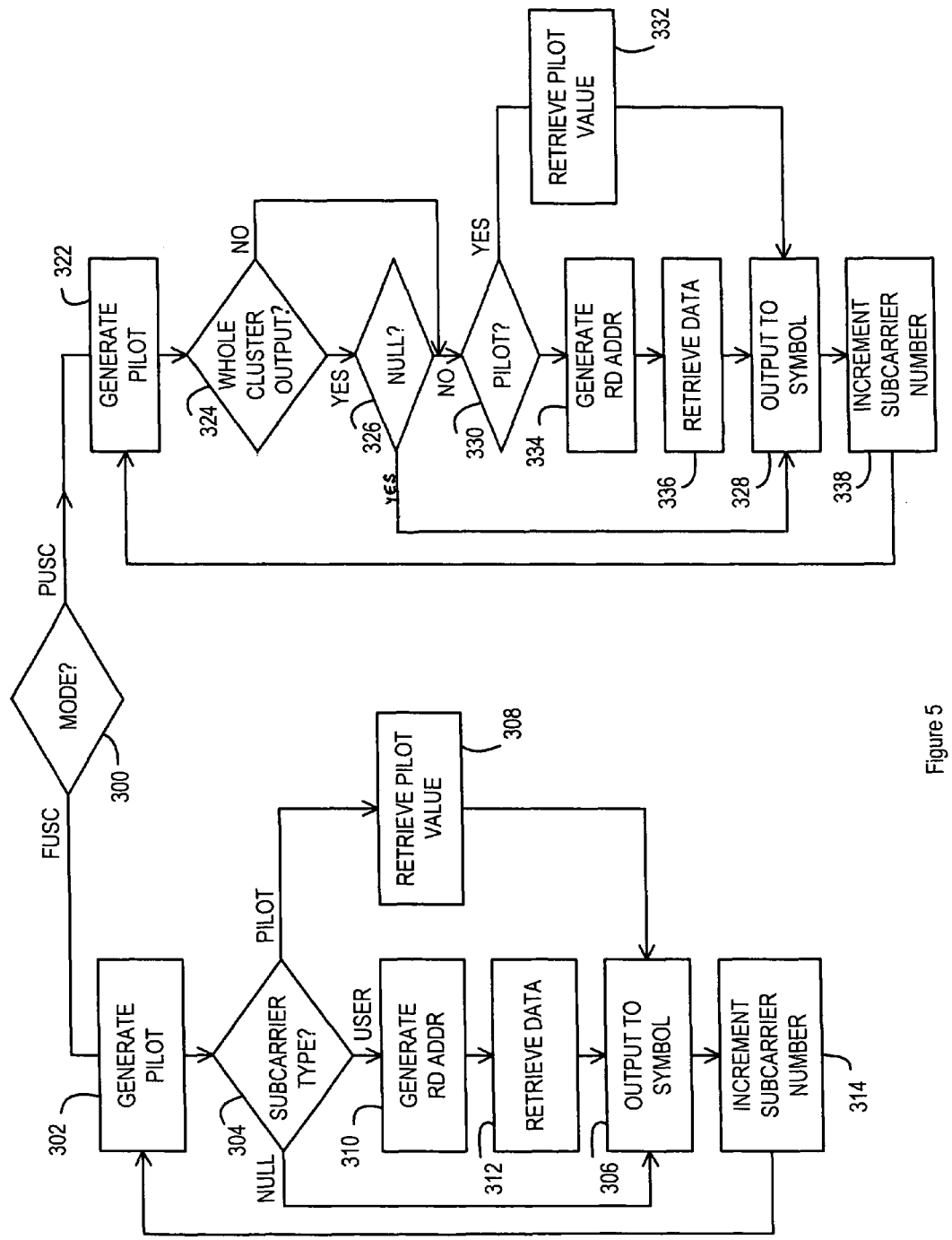
FIG. 5 is a flow diagram of the method of generating an OFDMA symbol in accordance with an aspect of the invention.

FIG. 5 is a flow diagram of the method of OFDMA symbol generation in accordance with an aspect of the invention.

First, the mode of operation of the subchannelization module, FUSC or PUSC, is determined in step 300. If the subchannelization module is operating in FUSC mode, the process passes to step 302 and a pilot value is generated by the pilot generator 180, based on an initial subcarrier number, as determined by the counter 155.

Then, in step 304, a formula from the IEEE specification is used in conjunction with the current subcarrier number to determine which type of subcarrier should be output, specifically, whether that subcarrier is a null, or carries pilot information or user data. If it is determined that the subcarrier should be a null subcarrier, then the process passes directly to step 306 and a null value is output to the symbol.

If it is determined in step 304 that the subcarrier is a pilot subcarrier, then the pilot value generated in step 302 is retrieved in step 308, and subsequently the process passes to step 306 and that pilot value is output to the symbol.

If it is determined in step 304 that the subcarrier should carry user data, the process moves to step 310, and a read address from which to read the relevant user data is generated. It should be noted that this is a simple step as the data has already been stored in memory according to the order in which it will be read out. Thus, the read address from which the user data is to be read is simply incremented from the read address from which user data was last read, even though this may not have been for the immediately preceding subcarrier.

The process then passes to step 312, in which the data stored in the memory 130 at the address generated in step 310 is read out, and in step 306 the data read out from the memory 130 is output to the symbol. As the read address from which the user data is to be read is simply incremented from the read address from which user data was last read, the user data is thus read out sequentially.

After outputting the null value, or the pilot value or the retrieved user data to the symbol, based on the subcarrier number according to the aforementioned method, the subcarrier number counter 155 is incremented in step 314, and the process returns to step 302, in which a new pilot value is generated, and then to step 304.

If it is instead determined in step 300 that the subchannelization module is operating in PUSC mode, the process passes to step 322 and a pilot value is generated by the pilot generator 180, based on the initial subcarrier number, as determined from the counter 155.

Then, in step 324, it is determined whether a complete cluster, as defined in the IEEE specification, has been output. If a complete cluster has been output, or if the process has reached step 324 for the first time, the process then passes to step 326, in which it is determined from the appropriate formula from the IEEE specification, in conjunction with the current subcarrier number, whether that subcarrier is a null.

If it is determined that the subcarrier should be a null subcarrier, then the process passes directly to step 328 and a null value is output to the symbol.

If it is determined in step 326 that the subcarrier should not be a null subcarrier, then the process passes to step 330, in order to determine which type of subcarrier should be output, specifically, whether the subcarrier carries pilot information or user data.

If it is determined in step 330 that the subcarrier is a pilot subcarrier, then the pilot value generated in step 322 is retrieved in step 332, and subsequently the process passes to step 328 and that pilot value is output to the symbol.

If it is determined in step 330 that the subcarrier is not a pilot subcarrier, that is, that it should carry user data, the process moves to step 334, and a read address from which to read the relevant user data is generated. It should be noted that, within any particular cluster, this is a simple step as the data has already been stored in memory according to the order in which it will be read out. Thus, the read address from which the user data is to be read is simply incremented from the read address from which user data was last read, even though this may not have been for the immediately preceding subcarrier. Moving from one cluster to the next will require a more complex calculation of the read address from which the user data is to be read, because data is written into the memory 130 in order of the lowest physical cluster to the highest physical cluster, but is read out of the memory 130 in order of the lowest logical cluster to the highest logical cluster. However, this calculation is required relatively infrequently.

The process then passes to step 336, in which the data stored in the memory 130 at the address generated in step 334 is read out, and in step 328 the data read out from the memory 130 is output to the symbol. As the read address from which the user data is to be read is simply incremented from the read address from which user data was last read, within each cluster, the user data is thus read out piecewise sequentially.

After outputting the null value, or the pilot value or the retrieved user data to the symbol, based on the subcarrier number according to the aforementioned method, the subcarrier number counter 155 is incremented in step 338, and the process returns to step 322, in which a new pilot value is generated, and then to step 324, in which it is determined whether the output of the preceding subcarrier completed a cluster.

Thus the present invention provides a method and a device for allocating data to subcarriers in a broadband wireless access OFDMA system, that have both low latency and low memory requirements.

Moreover, it will be noted that subchannelization module 10 is broadly split into two parts by the presence of memory 130 in the middle. The first part writes the data into the memory in an order which allows the second part to read the data in a convenient way and generate the symbol. It is an added benefit of the present invention that this simple construction allows the operation of the module to be tested very easily, with any errors easily isolated and corrected.

The invention claimed is:

1. A method of generating an orthogonal frequency division multiple access (OFDMA) symbol, the method comprising:
   receiving incoming data packets;
   determining a first index associated with each data packet of the incoming data packets;
   storing each data packet of the incoming data packets at an address in a memory according to the first index associated therewith;
   selecting a subcarrier associated with the OFDMA symbol;
   determining whether to transmit pilot information or non-pilot information on said subcarrier;
   reading a stored data packet from said memory in response to determining that non-pilot information will be transmitted on said subcarrier and modulating said subcarrier using information contained in said stored data packet;
   generating a pilot symbol associated with a next subcarrier of the OFDMA symbol;
   incorporating said pilot symbol in the OFDMA symbol in response to determining that the next subcarrier is associated with transmission of said pilot information; and
   holding said pilot symbol in response to determining that that the next subcarrier is associated with transmission of said non-pilot information.

2. A method as claimed in claim 1, wherein said non-pilot information comprises data information and null information.

3. A method as claimed in claim 1, further comprising:
   flagging each incoming data packet according to a subchannel assigned thereto, and wherein said determining said first index is based on the subchannel assigned.

4. A method as claimed in claim 1, wherein said first index is a physical data subcarrier index in a fully used subchannelization (FUSC) mode.

5. A method as claimed in claim 1, further comprising:
   grouping the received incoming data packets into clusters in a partial subchannelization (PUSC) mode, wherein each cluster comprises data to be transmitted by a plurality of data subcarriers.

6. A method as claimed in claim 5, wherein each cluster comprises data to be transmitted by twelve data subcarriers.

7. A method as claimed in claim 5, wherein said first index is a logical cluster index.

8. A method as claimed in claim 1, wherein the memory is a dual port RAM memory.

9. A method as claimed in claim 5, wherein the memory is operable to store the data for four complete OFDMA symbols.

10. A subchannelization module, for use in a transmitter of an orthogonal frequency division multiple access (OFDMA) system, the module comprising:
    an input, for receiving incoming data packets;
    a memory;
    an input controller, for determining a first index associated with each received data packet of the incoming data packets, and for storing each received data packet of the incoming data packets at an address in said memory according to the first index associated therewith;
    a selection controller for selecting a subcarrier associated with an OFDM symbol;
    an output controller for:
    determining whether to transmit pilot information or non-pilot information on said subcarrier, and
    reading a stored data packet from said memory in response to determining that non-pilot information will be transmitted on said subcarrier and modulating said subcarrier using information contained in said stored data packet;
    a pilot symbol generator, for generating a pilot symbol associated with a next subcarrier of the OFDMA symbol; and
    a pilot index generator, for:
    incorporating said pilot symbol in the OFDMA symbol in response to determining that the next subcarrier is associated with transmission of said pilot information; and
    holding said pilot symbol in response to determining that that the next subcarrier is associated with transmission of said non-pilot information.

11. A module as claimed in claim 10, wherein said non-pilot information comprises data information and null information.

12. A module as claimed in claim 10, further comprising:
a detector for flagging each incoming data packet according to a subchannel assigned thereto, and wherein said determining said first index is based on the subchannel assigned.

13. A module as claimed in claim 10, wherein the module is operable in a fully used subchannelization (FUSC) mode or in a partially used subchannelization (PUSC) mode.

14. A module as claimed in claim 13, wherein, when operating in the FUSC mode, said first index is a physical data subcarrier index.

15. A module as claimed in claim 14, wherein the input controller is adapted to group the received incoming data packets into clusters in the PUSC mode, and wherein each cluster comprises data to be transmitted through a plurality of data subcarriers.

16. A module as claimed in claim 15, wherein each cluster comprises data to be transmitted by twelve data subcarriers.

17. A module as claimed in claim 15, wherein, when operating in the PUSC mode, said first index is a logical cluster index.

18. A module as claimed in claim 10, wherein the memory is dual port RAM memory.

19. A module as claimed in claim 10, wherein the memory is operable to store the data for four complete OFDMA symbols.

20. A module as claimed in claim 10, wherein the module is implemented in a Field Programmable Gate Array device.

* * * * *